United States Patent
Cheong et al.

(10) Patent No.: US 8,861,131 B2
(45) Date of Patent: Oct. 14, 2014

(54) BASE ASSEMBLY AND RECORDING DISK DRIVING DEVICE INCLUDING THE SAME

(71) Applicant: Samsung Electro-Mechanics Co., Ltd., Suwon (KR)

(72) Inventors: Shin Young Cheong, Suwon (KR); Il Geun Jeon, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/851,674

(22) Filed: Mar. 27, 2013

(65) Prior Publication Data

US 2014/0218822 A1    Aug. 7, 2014

(30) Foreign Application Priority Data

Feb. 5, 2013    (KR) .......................... 10-2013-0012686

(51) Int. Cl.
*G11B 25/04*    (2006.01)

(52) U.S. Cl.
USPC ....................................... 360/99.16

(58) Field of Classification Search
USPC ..................................... 360/99.16
See application file for complete search history.

(56) References Cited

U.S. PATENT DOCUMENTS

| | | | | |
|---|---|---|---|---|
| 4,672,487 A * | 6/1987 | Brand et al. | ................ | 360/98.07 |
| 5,223,996 A * | 6/1993 | Read et al. | ................ | 360/99.18 |
| 6,034,841 A | 3/2000 | Albrecht et al. | | |
| 6,560,063 B1 * | 5/2003 | Keffeler et al. | ............ | 360/99.16 |
| 6,982,850 B1 | 1/2006 | Ying | | |
| 8,320,072 B2 * | 11/2012 | Hanssen et al. | ............ | 360/99.21 |
| 2004/0150909 A1 | 8/2004 | Kimura et al. | | |
| 2010/0232059 A1 * | 9/2010 | Choi | ......................... | 360/97.02 |
| 2011/0317310 A1 | 12/2011 | Kim et al. | | |

FOREIGN PATENT DOCUMENTS

| | | |
|---|---|---|
| EP | 1113437 A1 | 7/2001 |
| JP | 11-353865 | 12/1999 |
| JP | 2001-184835 | 7/2001 |
| JP | 2001-216755 | 8/2001 |
| JP | 2004-152403 | 5/2004 |
| KR | 10-2012-0000909 | 1/2012 |

OTHER PUBLICATIONS

Korean Office Action mailed Mar. 24, 2014 in corresponding Korean Application No. 10-2013-0012686.

* cited by examiner

*Primary Examiner* — Mark Blouin

(57) ABSTRACT

There is provided a base assembly including a base member formed of a metal plate to be molded by plastic working and including a coupling part formed at an edge thereof, and a strength reinforcing member formed of metal and coupled to the coupling part, wherein the strength reinforcing member has a thickness greater than that of the base member to prevent deformation of the base member.

12 Claims, 4 Drawing Sheets

BASE ASSEMBLY AND RECORDING DISK DRIVING DEVICE INCLUDING THE SAME

CROSS-REFERENCE TO RELATED APPLICATION

This application claims the priority of Korean Patent Application No. 10-2013-0012686 filed on Feb. 5, 2013, in the Korean Intellectual Property Office, the disclosure of which is incorporated herein by reference.

BACKGROUND OF THE INVENTION

1. Field of the Invention

The present invention relates to a base assembly and a recording disk driving device including the same.

2. Description of the Related Art

A hard disk drive (HDD), a computer information storage device, reads data stored on a disk or writes data to a disk using a magnetic head.

In a hard disk drive, a base is provided with a head driver, that is, a head stack assembly (HSA), capable of moving the magnetic head across the face of the disk. The magnetic head performs its function while moving to a desired position in a state in which it is suspended above a writing surface of the disk at a predetermined height by the head driver.

According to the related art, in manufacturing a base included in the hard disk drive, a post-processing scheme of die-casting aluminum (Al) and then removing burrs, or the like, generated due to the die-casting, has been used.

However, in the die-casting scheme according to the related art, since a process of injecting aluminum (Al) for forging in a molten state is performed, high levels of temperature and pressure are required, such that a large amount of energy is required in the process and a process time is increased.

Further, in terms of a lifespan of a die-casting mold, there is a limitation in manufacturing a large number of bases using a single mold, and a base manufactured in the die-casting process may have poor dimensional precision.

Therefore, in order to solve problems in the die-casting process, the base has been manufactured using a pressing process. However, in the case of manufacturing the base by the pressing process, the base is required to have a uniform thickness, due to a process of pressing and bending a plate.

Therefore, at the time of manufacturing the base, deformation or twisting of the base may occur. Further, a structure having a complicated shape may not be able to be implemented.

RELATED ART DOCUMENT

Japanese Patent Laid-Open Publication No. 2001-184835

SUMMARY OF THE INVENTION

An aspect of the present invention provides a base assembly in which deformation or twisting of a base member may be prevented and capable of being precisely molded, and a recording disk driving device including the same.

According to an aspect of the present invention, there is provided a base assembly including: a base member formed of a metal plate to be molded by plastic working and including a coupling part formed at an edge thereof; and a strength reinforcing member formed of metal and coupled to the coupling part, wherein the strength reinforcing member has a thickness greater than that of the base member to prevent deformation of the base member.

The base member may be formed of a cold rolled steel sheet or a hot rolled steel sheet.

The strength reinforcing member may be formed of aluminum or stainless steel.

The strength reinforcing member may be coupled to the base member by injection-molding so that the coupling part is completely or partially enclosed thereby.

The strength reinforcing member may be formed of a material having a lower melting point than that of the base member.

The coupling part may be bent at least once.

The coupling part may include a first wall member contacting an inner surface of the strength reinforcing member, a second wall member extended from the first wall member in a horizontal direction, and a third wall member extended from the second wall member in a vertical direction.

The coupling part may include a first wall member extended in a vertical direction and a second wall member extended from the first wall member in a horizontal direction and enclosed in the strength reinforcing member.

The coupling part may be extended from an edge of a body enclosed in the strength reinforcing member in a vertical direction.

The coupling part may include a first wall member extended from a body in a vertical direction, a second wall member extended from the first wall member in a horizontal direction, and a third wall member extended from the second wall member in a direction opposite to the direction in which the first wall member is extended.

The strength reinforcing member may be inserted into and coupled to a coupling groove formed by the first to third wall members.

The strength reinforcing member may be coupled to the coupling groove in at least one of a press-fitting scheme, an adhesion scheme, a caulking scheme, and a screwing scheme.

The strength reinforcing member may be provided with a plurality of screw portions.

According to an aspect of the present invention, there is provided a recording disk driving device including: the base assembly as described above; a head stack assembly transferring a head reading information from a recording disk to the recording disk; and a cover forming, together with the base assembly, a receiving space in which the head stack assembly is received.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the inventive concept will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
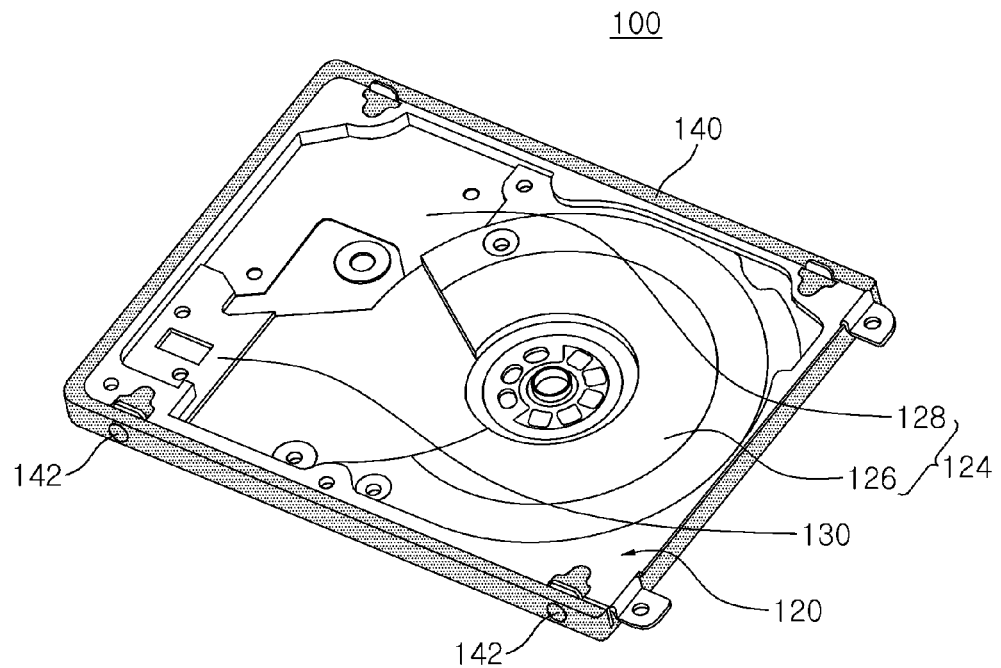
FIG. 1 is a schematic perspective view showing a base assembly according to an embodiment of the present invention.
Figure 2:
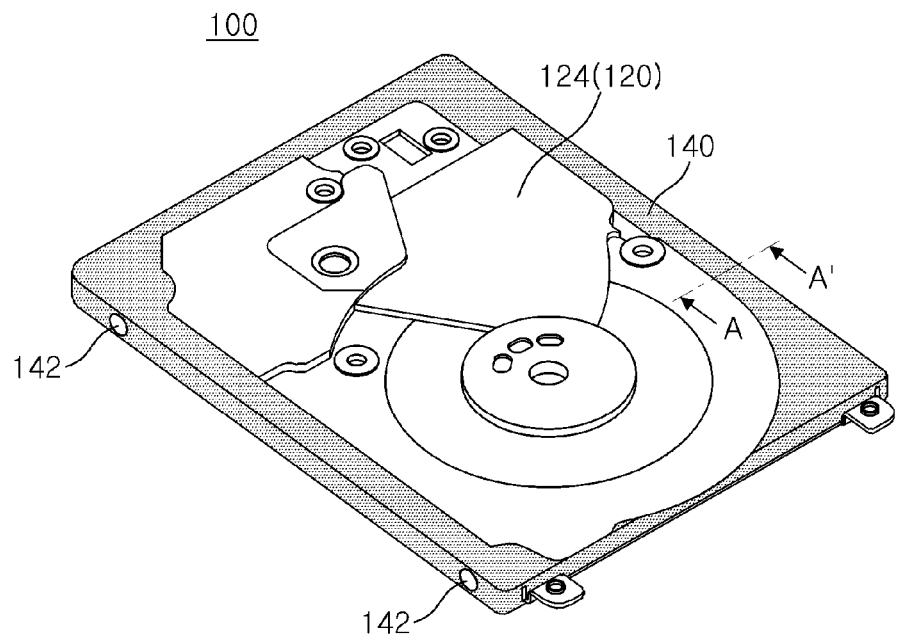
FIG. 2 is a bottom perspective view showing the base assembly according to the embodiment of the present invention.

FIG. 1 is a schematic perspective view showing a base assembly according to an embodiment of the present invention; FIG. 2 is a bottom perspective view showing the base assembly according to the embodiment of the present invention; and FIG. 3 is a cross-sectional view taken along line A-A' of FIG. 2.

Figure 3:
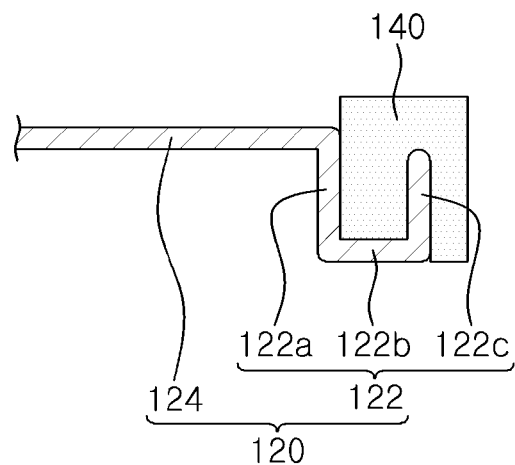
FIG. 3 is a cross-sectional view taken along line A-A' of FIG. 2.

Referring to FIGS. 1 through 3, the base assembly 100 according to the embodiment of the present invention may include a base member 120 and a strength reinforcing member 140 by way of example.

First, terms relating to directions will be defined. As viewed in FIG. 1, a length direction refers to an X direction, a width direction refers to a Y direction, and a thickness direction refers to a Z direction.

The base member 120 may be formed of a metal plate to be molded by plastic working and include a coupling part 122 formed at an edge thereof. In other words, the base member 120 may be molded by, for example, press working. In addition, the base member 120 may include a body 124 and the coupling part 122 (See FIG. 3) formed at an edge of the body 124.

The body 124 may have a substantially rectangular shape when viewed from above, and the coupling part 122 may be formed at at least three corners of the body 124 having the rectangular shape.

Meanwhile, the body 124 may include a disk accommodating part 126, a head stack assembly accommodating part 128, and a bracket device accommodating part 130 formed therein. Here, after basic shapes of the body 124 and the coupling part 122 are formed by press working, and final shapes thereof may be formed by bending or cutting, additional processes.

That is, the base member 120 may be manufactured in a single process by press working or in a single process with an additional process, unlike the base manufactured in the post-processing scheme according to the related art in which aluminum (Al) is die-cast and burrs, or the like, generated due to the die-casting, are then removed.

In other words, the base member 120 may be molded by disposing a cold rolled steel sheet (SPCC, SPCE, or the like), a hot rolled steel sheet, a lightweight alloy steel sheet formed of a metal such as stainless steel, a boron or magnesium alloy, or the like, in a pressing mold and applying a predetermined amount of pressing pressure thereto.

Meanwhile, the disk accommodating part 126, which has a disk D (See FIG. 8) disposed thereon, may generally have a circular shape to correspond to a shape of the disk D. More specifically, the disk accommodating part 126 may be formed by depressing a partial region of the body 124 downwardly to allow the disk D to be accommodated therein.

In addition, the head stack assembly accommodating part 128 may be disposed to be adjacent to the disk accommodating part 126 and may have a head stack assembly (HSA) 720 (See FIG. 8) mounted thereon.

Further, the bracket device accommodating part 130 may be disposed to be adjacent to the head stack assembly accommodating part 128 and may have a bracket device 665 (See FIG. 8) installed thereon.

Further, the disk accommodating part 126, the head stack assembly accommodating part 128, and the bracket device accommodating part 130 may be simultaneously formed and may be stepped with regard to one another.

The coupling part 122 may be extended from the body 124 and may be bent at least once.

For example, the coupling part 122 may include a first wall member 122a contacting an inner surface of the strength reinforcing member 140, a second wall member 122b extended from the first wall member 122a in a horizontal direction, and a third wall member 122c extended from the second wall member 122b in a vertical direction.

In addition, the coupling part 122 may also be simultaneously formed to be integral with the body 124 by press working.

In addition, since the coupling part 122 includes the first to third wall members 122a, 122b, and 122c, a contact area between the coupling part 122 and the strength reinforcing member 140 increases, such that coupling force between the coupling part 122 and the strength reinforcing member 140 may increase.

The strength reinforcing member 140 may be formed of metal and may be coupled to the coupling part 122. In addition, a height of the strength reinforcing member 140 in a thickness direction may be greater than that of the base member 120 to prevent deformation of the base member 120.

As an example, the strength reinforcing member 140 may have a cross section with a shape corresponding to that of the edge of the body 124, and a height of the strength reinforcing member 140 in the thickness direction and a distance of the strength reinforcing member 140 in a width direction may be greater than those of the base member 120.

Meanwhile, the strength reinforcing member 140 may be formed of aluminum or stainless steel.

In addition, the strength reinforcing member 140 may be formed by injection molding so that the coupling part 122 is partially enclosed thereby. That is, after the base member 120 is mounted in an injection mold, the strength reinforcing member 140 may be molded by injection-molding aluminum, stainless steel, or the like.

Further, the strength reinforcing member 140 may be formed of a material having a lower melting point than that of the base member 120. In other word, the strength reinforcing member 140 needs to have a lower melting point than that of the base member 120 so that the strength reinforcing member 140 may be molded by injection-molding after the base member 120 is mounted in the injection mold.

Meanwhile, the strength reinforcing member 140 may be provided with a plurality of screw portions 142. The screw portions 142 may be configured of a plurality of screw holes and/or screw grooves. That is, since the strength reinforcing member 140 is formed by the injection-molding, the screw portion 142 may be easily formed, and a shape of the screw portion 142 may be more freely changed.

As described above, twisting or deformation of the base member 120 may be prevented by the strength reinforcing member 140.

In addition, since a complicated shape that may not be molded by press working may be implemented by the strength reinforcing member 140 molded by the injection-molding, the molding may be more precisely performed.

In other words, since the screw groove, the screw hole, or the like, that may not be precisely molded in the case in which it is molded by press working is formed in the strength reinforcing member 140 molded by the injection-molding, it may be more precisely molded.

Hereinafter, modified examples of the base assembly according to the embodiment of the present invention will be described. Meanwhile, the same components as the above-mentioned components will be denoted by the same reference numerals, and a detailed description thereof will be replaced by the above-mentioned description and be omitted below.

Figure 4:
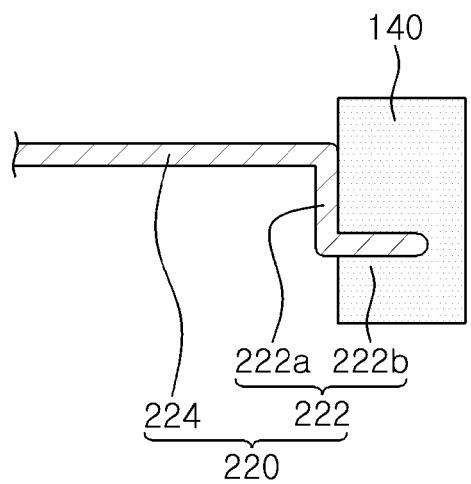
FIG. 4 is an enlarged cross-sectional view showing a portion corresponding to FIG. 3 in order to describe a modified example of a coupling part included in a base member.

FIG. 4 is an enlarged cross-sectional view showing a portion corresponding to FIG. 3 in order to describe a modified example of a coupling part included in a base member.

Referring to FIG. 4, a base member 220 may include a body 224 and a coupling part 222.

Meanwhile, the coupling part 222 may include a first wall member 222a extended from the body 224 in a vertical direction and a second wall member 222b extended from the first wall member 222a in a horizontal direction and partially or completely enclosed in the strength reinforcing member 140.

Meanwhile, the strength reinforcing member 140 may have a cross section with a shape corresponding to that of the edge of the body 224, and the height of the strength reinforcing member 140 in the thickness direction and a distance of the strength reinforcing member 140 in the width direction may be greater than those of the base member 120.

In addition, the strength reinforcing member 140 may be formed by injection molding so that the second wall member 222b of the coupling part 222 is partially enclosed thereby. That is, after the base member 220 is mounted in an injection mold, the strength reinforcing member 140 may be molded by injection-molding aluminum, stainless steel, or the like. To this end, the strength reinforcing member 140 may be formed of a material having a lower melting point than that of the base member 120.

Meanwhile, the strength reinforcing member 140 may be provided with a plurality of screw portions 142. The screw portions 142 may be configured of a plurality of screw holes and/or screw grooves. That is, since the strength reinforcing member 140 is formed by the injection-molding, the screw portion 142 may be easily formed, and a shape of the screw portion 142 may be more freely changed.

Figure 5:
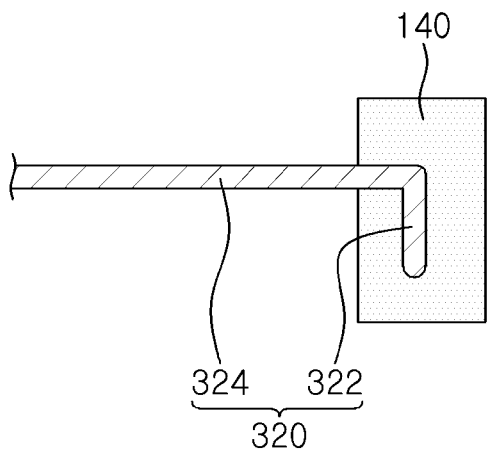
FIG. 5 is an enlarged cross-sectional view showing a portion corresponding to FIG. 3 in order to describe another modified example of a coupling part included in a base member.

FIG. 5 is an enlarged cross-sectional view showing a portion corresponding to FIG. 3 in order to describe another modified example of a coupling part included in a base member.

Referring to FIG. 5, a base member 320 may include a body 324 and a coupling part 322.

Meanwhile, the coupling part 322 may be extended from an edge of the body 324 enclosed in the strength reinforcing member 140 in a vertical direction.

That is, the strength reinforcing member 140 may be coupled to the base member 320 so that an edge of the body 324 and the coupling part 322 are enclosed thereby.

Meanwhile, the strength reinforcing member 140 may have a cross section with a shape corresponding to that of the edge of the body 324, and a height of the strength reinforcing member 140 in the thickness direction and a distance of the strength reinforcing member 140 in a width direction may be greater than those of the base member 120. Further, the strength reinforcing member 140 may be formed by injection-molding.

Figure 6:
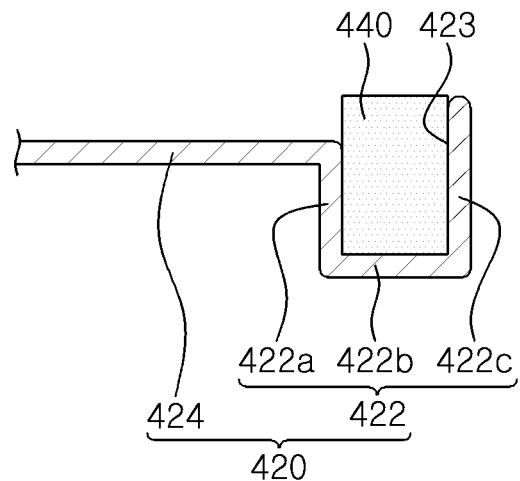
FIG. 6 is an enlarged cross-sectional view showing a portion corresponding to FIG. 3 in a base assembly according to another embodiment of the present invention.

FIG. 6 is an enlarged cross-sectional view showing a portion corresponding to FIG. 3 in a base assembly according to another embodiment of the present invention.

Referring to FIG. 6, the base assembly according to another embodiment of the present invention may include a base member 420 and a strength reinforcing member 440.

Meanwhile, the base member 420 may include a body 424 and a coupling part 422. In addition, since the body 424 is substantially the same as the body 124 included in the base member 120 of the base assembly 100 according to the embodiment of the present invention described above, a detailed description thereof will be omitted.

The coupling part 422 may include a first wall member 422a extended from the body 424 in a vertical direction, a second wall member 422b extended from the first wall member 422a in a horizontal direction, and a third wall member 422c extended from the second wall member 422b in a direction opposite to the direction in which the first wall member 422a is extended.

In addition, a coupling groove 423 may be formed by the first to third wall members 422a, 422b, and 422c.

The strength reinforcing member 440 may be inserted into the above-mentioned coupling groove 423. To this end, the strength reinforcing member 440 may have a shape corresponding to that of the coupling groove 423.

Meanwhile, the strength reinforcing member 440 may be fixed to the coupling groove 423 in at least one of a press-fitting scheme, an adhesion scheme, and a caulking scheme.

That is, the strength reinforcing member 440 may be manufactured separately from the base member 420 and may then be inserted into the coupling groove 423 of the base member 420.

In addition, although not shown in FIG. 6, the strength reinforcing member 440 may be provided with a plurality of screw portions (not shown). Further, the coupling part 422 of the base member 420 may include through-holes (not shown) formed therein to correspond to the screw portions of the strength reinforcing member 440.

Figure 7:
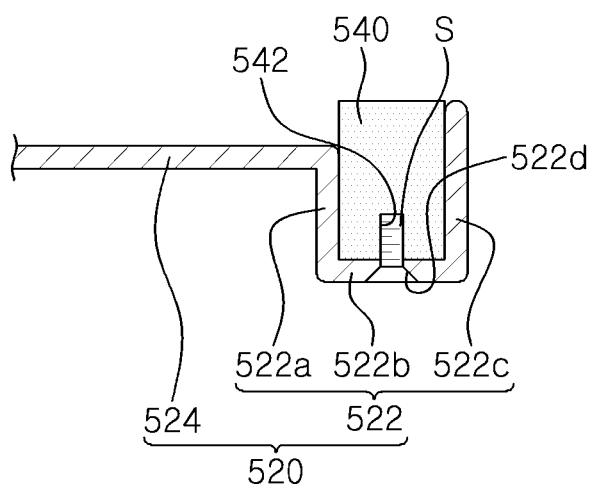
FIG. 7 is an enlarged cross-sectional view showing a portion corresponding to FIG. 3 in a base assembly according to another embodiment of the present invention.

FIG. 7 is an enlarged cross-sectional view showing a portion corresponding to FIG. 3 in a base assembly according to another embodiment of the present invention.

Referring to FIG. 7, the base assembly according to another embodiment of the present invention may include a base member 520 and a strength reinforcing member 540.

Meanwhile, the base member 520 may include a body 524 and a coupling part 522. In addition, since the body 524 is substantially the same as the body 124 included in the base member 120 of the base assembly 100 according to the embodiment of the present invention described above, a detailed description thereof will be omitted.

The coupling part 522 may include a first wall member 522a extended from the body 524 in a vertical direction, a second wall member 522b extended from the first wall member 522a in a horizontal direction, and a third wall member 522c extended from the second wall member 522b in a direction opposite to the direction in which the first wall member 522a is extended.

In addition, a coupling groove 523 may be formed by the first to third wall members 522a, 522b, and 522c.

Further, the second wall member 522b may be provided with an installation hole 522d through which a screw S penetrates.

The installation hole 522d may have a shape corresponding to that of a head part of the screw S.

The strength reinforcing member 540 may be inserted into the above-mentioned coupling groove 523. To this end, the strength reinforcing member 540 may have a shape corresponding to that of the coupling groove 523.

Meanwhile, the strength reinforcing member 540 may be fixed to the coupling groove 523 in a screw fastening scheme.

That is, the strength reinforcing member 540 may be manufactured separately from the base member 520 and then inserted into the coupling groove 523 of the base member 520.

To this end, the strength reinforcing member 540 may be provided with an installation groove 542 corresponding to the installation hole 522d, wherein the installation groove 542 may have a female screw formed on an inner peripheral surface thereof.

In addition, although not shown in FIG. 7, the strength reinforcing member 540 may be provided with a plurality of screw portions (not shown). Further, the coupling part 522 of the base member 520 may include through-holes (not shown) formed therein to correspond to the screw portions of the strength reinforcing member 540.

Hereinafter, a recording disk driving device according to the embodiment of the present invention will be described with reference to the accompanying drawings.

Figure 8:
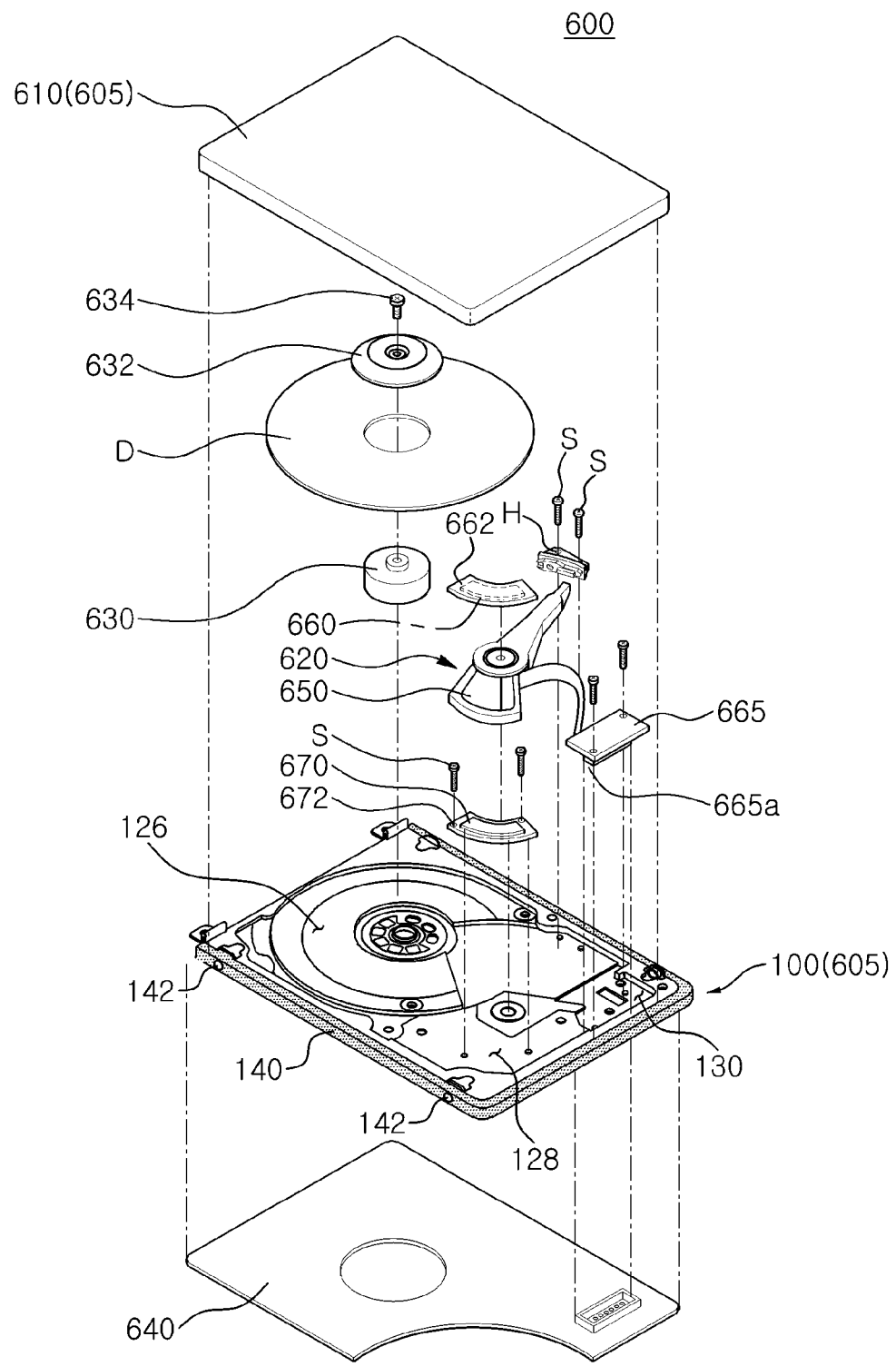
FIG. 8 is an exploded perspective view showing a recording disk driving device according to the embodiment of the present invention.

FIG. 8 is an exploded perspective view showing a recording disk driving device according to the embodiment of the present invention.

Referring to FIG. 8, the recording disk driving device 600 according to the embodiment of the present invention may include a base assembly 100, a head stack assembly (HSA) 620, a spindle motor 630, and a main circuit board 640 by way of example.

Meanwhile, the base assembly 100 is substantially the same as the base assembly 100 according to the embodiment of the present invention described above. Therefore, a detailed description of the base assembly 100 will be replaced by the above-mentioned description and will be omitted below.

Further, in FIG. 8, reference numerals of components included in the base assembly 100 are not used in detail. Therefore, detailed reference numerals will be described with reference to FIGS. 1 through 3.

In addition, the base assembly 100 may configure a housing 605 forming an outer casing together with a cover 610 in the recording disk driving device 600. That is, the housing 605 may be configured of the base assembly 100 and the cover 610, and the base assembly 100 and the cover 610 may be coupled to each other to form an internal space in which the head stack assembly 620, or the like, is received.

The head stack assembly 620 may have a magnetic head mounted thereon and move the magnetic head to a predetermined position to write data to the disk D or read data written on the disk D.

In addition, the head stack assembly 620 may move the magnetic head to a predetermined position above the disk D using a voice coil motor (VCM) including a coil 650 and upper and lower magnets 660 and 670.

Here, the upper and lower magnets 660 and 670 disposed on upper and lower portions of the coil 650 provided in the VCM may be respectively coupled to upper and lower yokes 662 and 672 in order to increase magnetic flux density and be fixed to the base member 120.

The VCM may be controlled by a servo control system and rotate the head stack assembly 620 around a pivot axis 652 in a direction according to the Fleming's left hand rule by interaction between current input by the coil 650 provided in the VCM and magnetic fields formed by the upper and lower magnets 660 and 670.

Here, an operation of the head stack assembly 620 will be schematically described. First, when an operation start command is input and the disk D thus starts to rotate, the VCM may rotate a swing arm in a counterclockwise direction to move the magnetic head H to a position above a writing surface of the disk D.

Further, when an operation stop command is input, the VCM may rotate the swing arm in a clockwise direction to allow the magnetic head to be removed from the disk D.

Meanwhile, the magnetic head removed from the writing surface of the disk D may be parked on a ramp (not shown) disposed outwardly of the disk D.

Here, the ramp (not shown) may allow the magnetic head to be spaced apart from the disk D by a predetermined interval in the case in which the magnetic head moves to the disk D, simultaneously with parking the magnetic head, whereby the data may be stably read from the disk D.

Meanwhile, the head stack assembly 620 may be electrically connected to the main circuit board 640 disposed on a lower surface of the base member 120 to provide driving force to the VCM to rotate the swing arm.

The operation described above may be implemented through a bracket device 665 including a terminal 665a. That is, the main circuit board 640 and the head stack assembly 620 may be electrically connected to each other by the bracket device 665.

The bracket device 665 may be a component of the HSA 620 and include a connector (not shown) connecting the HSA 620 to the main circuit board 640 disposed on a lower surface of the base member 120.

Meanwhile, the spindle motor 530, a component for rotating the disk D, may be fixedly installed in the center of the disk accommodating part 122 of the base member 120.

The disk D may be mounted on the spindle motor 630 to rotate by driving of the spindle motor 630, and have a writing surface on which data is written.

In addition, the spindle motor 630 may include a clamp 632 provided above the spindle motor, to firmly fix the disk D to an upper end portion of the spindle motor by a screw 634.

Further, although the case in which a single disk D is mounted on the spindle motor 630 is shown in FIG. 8, the present invention is not limited thereto. That is, one or more disks may be mounted on the spindle motor 630.

Further, in the case in which a plurality of disks D are mounted on the spindle motor 630, a ring shaped spacer may be interposed between the plurality of disks D in order to maintain an interval therebetween.

As set forth above, according to the embodiment of the present invention, the twisting or the deformation of the base member may be prevented by the strength reinforcing member.

In addition, since a complicated shape that may not be molded by press working may be implemented by the strength reinforcing member, the molding may be more precisely performed.

While the present invention has been shown and described in connection with the embodiments, it will be apparent to those skilled in the art that modifications and variations can be made without departing from the spirit and scope of the invention as defined by the appended claims.

What is claimed is:

1. A base assembly comprising:
a base member formed of a metal plate to be molded by plastic working and including a coupling part formed at an edge thereof; and
a strength reinforcing member formed of metal and coupled to the coupling part,
wherein the strength reinforcing member has a thickness greater than that of the base member to prevent deformation of the base member, and
wherein the strength reinforcing member is coupled to the base member by injection-molding so that the coupling part is completely or partially enclosed thereby.

2. The base assembly of claim 1, wherein the base member is formed of a cold rolled steel sheet or a hot rolled steel sheet.

3. The base assembly of claim 2, wherein the strength reinforcing member is formed of aluminum or stainless steel.

4. The base assembly of claim 1, wherein the strength reinforcing member is formed of a material having a lower melting point than that of the base member.

5. The base assembly of claim 1, wherein the coupling part is bent at least once.

6. The base assembly of claim 5, wherein the coupling part includes a first wall member contacting an inner surface of the strength reinforcing member, a second wall member extended from the first wall member in a horizontal direction, and a third wall member extended from the second wall member in a vertical direction.

7. The base assembly of claim 5, wherein the coupling part includes a first wall member extended in a vertical direction and a second wall member extended from the first wall member in a horizontal direction and enclosed in the strength reinforcing member.

8. The base assembly of claim 5, wherein the coupling part is extended from an edge of a body enclosed in the strength reinforcing member in a vertical direction.

9. The base assembly of claim 5, wherein the coupling part includes a first wall member extended from a body in a vertical direction, a second wall member extended from the first wall member in a horizontal direction, and a third wall member extended from the second wall member in a direction opposite to the direction in which the first wall member is extended, and
the strength reinforcing member is inserted into and coupled to a coupling groove formed by the first to third wall members.

10. The base assembly of claim 9, wherein the strength reinforcing member is coupled to the coupling groove in at least one of a press-fitting scheme, an adhesion scheme, a caulking scheme, and a screwing scheme.

11. The base assembly of claim 1, wherein the strength reinforcing member is provided with a plurality of screw portions.

12. A recording disk driving device comprising:
the base assembly of claim 1;
a head stack assembly transferring a head reading information from a recording disk to the recording disk; and
a cover forming, together with the base assembly, a receiving space in which the head stack assembly is received.

* * * * *